United States Patent

[11] 3,622,455

[72] Inventors Hiroshi Iizuka;
Junichi Shimizu; Kazumitsu Ishii;
Yoshikazu Nakajima, all of Tokyo, Japan
[21] Appl. No. 777,483
[22] Filed Nov. 20, 1968
[45] Patented Nov. 23, 1971
[73] Assignee Mitsui Sugar Co., Ltd.
Tokyo, Japan
[32] Priority Dec. 19, 1967
[33] Japan
[31] 42/80915

[54] PROCESS FOR THE PRODUCTION OF CITRIC ACID BY FERMENTATION
10 Claims, No Drawings

[52] U.S. Cl. ........................................................ 195/37
[51] Int. Cl. ........................................................ C12d 1/04
[50] Field of Search .......................................... 195/28, 32, 36, 37, 47

[56] References Cited
UNITED STATES PATENTS
3,438,863   4/1969   Batti .......................... 195/36

OTHER REFERENCES
Katsuda et al. Citric Acid Ferm. C. Abs. Vol. 52 No. 20880, 1958
Kudryautsev et al. Nonvolatile Acids Chemical Abstracts Vol. 58; No. 763, 1963.
Tabuckl et al. Citric Acid Chemical Abstracts Vol. 70, No. 18,927n, 1969.

*Primary Examiner*—A. Louis Monacell
*Assistant Examiner*—Gary M. Nath
*Attorney*—Sughrue, Rothwell, Mion, Zinn & Macpeak ABSTRACT: A process for the production of citric acid or its salts, which comprises culturing a microbial strain known as *Candida oleophila* under aerobic conditions in a culture medium containing assimilable carbohydrates, suitable neutralizing agents capable of neutralizing the citric acid so produced, and various inorganic and organic metabolites, thus producing a major amount of citrate, and recovering the citrate from the culture broth.

PROCESS FOR THE PRODUCTION OF CITRIC ACID BY FERMENTATION

Detailed Description

The present invention is concerned with a process for obtaining citric acid by fermentation. More particularly this invention relates to the method for the production of citric acid by culturing a strain of new species, *Candida oleophila*, belonging to the genus Candida in a liquid culture medium containing sugars under aerobic conditions to accumulate citric acid or its salt in a large quantity and recovering citric acid from the cultured broth. The purpose of the present invention is to obtain citric acid or its salts economically.

We have now found a new species of yeast during our studies concerning petroleum-assimilable yeasts and their metabolic products and also have found that said novel yeast produces citric acid in large quantity from carbohydrates as carbon source.

The taxonomic characteristics of the said new microorganism are as follows:

1. Growth in malt extract: After 3 days at 25° C. cells are oval or long oval, measuring (2.5 5.0)×(3.0 15.0)μ. A viscous wide ring or pellicle is formed on the surface of the culture medium. This ring or pellicle is smooth or wrinkled and light brownish cream. No ascospore is formed, but pseudomycelium is formed.
2. Streak culture on malt agar: After 3 days at 25° C. the streak culture is smooth and light brownish cream. The shape of cells is the same as the case of malt extract. No ascospore is formed, but pseudomycelium is formed.
3. Slide culture: Pseudomycelium develops well on potato agar.
4. Physiological properties:
   i. Optimum conditions of growth: pH 5.2, temperature 30° C., aerobic.
   ii. Assimilation of potassium nitrate: Absent
   iii. Coagulation of milk: Absent
   iv. Osmophilic property (in 10 percent NaCl medium): Absent
   v. Liquefaction of gelatin: Absent
   vi. Requirement of vitamins: Absent
   vii. Formation of carotinoid pigments: Absent
5. Assimilable nitrogen sources: Pepton, ammonium sulfate and urea.
6. Fermentation: Absent
7. Sugar assimilation:
   Glucose     +     Maltose    −
   Galactose   +     Lactose    −
   Sucrose     +     Starch     −
8. Ethanol as sole source of carbon: Good growth
9. Kerosene as sole source of carbon: Good growth
10. Splitting of arbutin: Absent
11. Distribution: This microorganism distributes in petroleum fuel tanks and the like.

In distinguishing the above mentioned taxonomic properties to that of the description in "The Yeast" (1952) by Lodder and Kreger-van Rij, though it is classified in the genus Candida, nothing is mentioned therein as to the corresponding description of the species with which the present microorganism can be identified. Thus, it appears to be closely related to the known species Candida rugosa, but differs clearly from the same in the assimilating ability of sucrose and in the formation of the viscous ring or pellicle in the case of culturing in malt extract.

Accordingly, the microorganisms applicable to the present invention are a novel species belonging to the genus Candida, to which we have given the name "*Candida oleophila*."

A culture of the living organism has been deposited with the ATCC the ATCC Deposit No. 20,177, the date of accession being Nov. 13, 1968. The ATCC is the American Type Culture collection which is located in Rockville, Maryland.

According to the present invention any strain belonging to *Candida oleophila* may be used for the present method. Any organism can be used for the present invention which can be recognized to be a mutant and a variant of *Candida olephila* having main mycological characteristics mentioned above.

In the conventional industrial production of citric acid by fermentation hitherto, mold was used and the surface the culture was mostly used as culture method. However, the submerged culture is now coming to a stage of practical use. In the submerged culture with molds, however, due to the properties of the strains belonging to *Aspergillus niger* as a typical strain, troublesome higher techniques are required for the fermentation management as follows:

1. Acid producing ability of the strain is quite unstable and the dealing of the fermentation is not easy.
2. It is liable to produce other acids besides citric acid.
3. Low pH value of the medium in the citric acid fermentation demands acid-proof fermenter.
4. As for the sugars to be used, since a sugar solution of comparatively higher purity is demanded, it is required to regulate the nutrient source strictly using raw sugar, desalted molasses or saccharified syrup of starch.
5. The duration of the fermentation is apt to alter widely.
6. In order to obtain high yields it is required to carry out the fermentation under addition of methanol, potassium ferrocyanide or the like.

In accordance with the method of the present invention for the production of citric acid using a strain belonging to *Candida oleophila*, said difficulties and troublesome fermentation managements can be avoided and also the recovering of citric acid can be attained quite easily.

The culture conditions of the fermentation using a strain belonging to *Candida oleophila* and also the conditions for the recovering of citric acid from the cultured broth according to the present invention are as follows.

The liquid culture medium used in accordance with the present invention contains besides saccharides a suitable amount of nitrogen source, inorganic salts (nutrient salts), vitamins and the like. The preferably carbohydrate used in the liquid medium is, for example, glucose, fructose, saccharified syrup of starch, and molasses. And even cane sugar blackstrap molasses which was thought hitherto to be difficult to use for the citric acid fermentation with *Aspergillus niger*, it is advantageously converted to citric acid in accordance with the present invention without the need for further treatments, such as desalting, and addition of potassium ferrocyanide or methanol.

It has hitherto been pointed out in the citric acid fermentation with mold that the residual saccharide increases and the yields of citric acid per supplied saccharide decreases when the concentration of saccharide in the medium is higher than 150 g. per liter (Prescott & Dunn: "Industrial Microbiology" third edition (1959), pg. 535, line 18).

When a strain belonging to *Candida oleophila* is used according to the present invention, the yield of citric acid increases in rather higher initial sugar concentrations (200 g. sugars/l. medium) as is seen from the table 1:

TABLE 1

| Initial sugar concentration | Culture day | Culture temperature, ° C. | Consumed sugar, percent | Yield of citric acid, percent | |
| --- | --- | --- | --- | --- | --- |
| | | | | Based on the supplied sugar | Based on the consumed sugar |
| 100 | 4 | 28 | 99.0 | 56.0 | 56.6 |
| 200 | 7 | 28 | 98.6 | 64.9 | 65.8 |

The results in table 1 are obtained under following conditions:

The inoculum is prepared by prepropagation of a strain of *Candida oleophila* on yeast-malt agar medium and then liquid yeast-malt medium and each 2.5 ml. proportion of the obtained inoculum is inoculated in 500 ml. volume shaking flasks each containing 25 ml. of the following fermentation medium:

| | |
|---|---|
| glucose | 110 g. or 220 g. |
| pepton | 5 g. |
| yeast extract | 3 g. |
| malt extract | 3 g. |
| H₂O fill up to | 1 L. |

After addition of calcium carbonate in the amount of 1.5 g. when the concentration of glucose is 100 g./l. or 3.0 g. when the concentration of glucose is 200 g./l. in each flask, fermentation is conducted at a temperature of 28° C. in a shaking stroke of 135/min. and amplitude of 5 cm.

Suitable nitrogen source used for the medium of the present invention is, for example, inorganic and organic ammonium salts such as, for example, ammonia, urea, ammonium chloride, ammonium sulfate or ammonium acetate, peptone, meat extract, yeast extract, corn steep liquor, fish meal and its digestion product, soybeam cake or its digestion product and the like, and these may be used individually or combining two or more.

In the citric acid fermentation using a strain of *Candida oleophila* according to the present invention, there is an optimum point of nitrogen level between about 0.5 g. and about 1.0 g. (assimilable nitrogen) per liter of the medium in connection with the amount of assimilable nitrogen source and the yield of citric acid, as can be seen from table 2 mentioned under. To control the nitrogen level of the medium in the submerged culture, the maximum cell number of the said organism in the medium such as maintaining in $8\times10^8 \sim 1\times10^9$ cells/ml. may be applied.

TABLE 2

Affect of the concentration of nitrogen source refers to the yield of citric acid

| *N-conc. (mg./l.) | Residual sugar (g./l.) | Yield of citric acid (g./l.) |
|---|---|---|
| 465 | 65.4 | 104 |
| 697 | 1.6 | 120 |
| 930 | 1.6 | 116 |
| 2,200 | 2.0 | 88 |

*Concentration of assimilable nitrogen

The results in table 2 was obtained under following conditions:

The experiment has been conducted with 500 ml. of shake flasks, each containing 25 ml. of the following fermentation medium:

| | |
|---|---|
| Glucose | 200 g. |
| KH₂PO₄ | 0.2 g. |
| MgSO₄·7H₂O | 0.2 g. |
| MnSO₄·nH₂O | 0.2 g. |
| Thiamine-HCl | 2 mg. |
| Nicotinic acid | 0.2 mg. |

Urea to give the N concentration set out in table 2 with water to fill up to 1,000 ml.

The inoculum of the strain of *Candida oleophila* was inoculated into each flask, and after addition of 2.5 g. of calcium carbonate the shake culture was cultured at a temperature of 28° C. for 7 days in an amplitude of 5 cm. and strokes of 135 per minute. Table 2 shows the results thus obtained:

As inorganic salts to be added to the liquid medium, phosphates and magnesium salts necessary for growing the organism may be used.

Besides the above-mentioned ingredients, cornsteep liquor, yeast extracts and vitamins such as thiamine and nicotinic acid may be added in the medium and also calcium carbonate may be used to neutralize the produced acids.

The cultivation according to the present invention is carried out under aerobic condition at a temperature of between about 22° and about 33° C. and a pH value of between about 4.0 and 8.0 for about 3~7 days.

As for the aerobic culture method, surface, shake or submerged culture may be used. However, submerged culture accompanied with stirring and aeration is suitable.

The rate of the aeration is about 1/8~2-fold of the volume of the medium per minute and the tank culture may be conducted at an atmospheric or elevated pressure.

According to the present invention, at the completion of the fermentation the citric acid produced occurs in the form of calcium citrate in the cultured medium by combining with calcium carbonate added therein.

To recover the citric acid from the cultured broth, it is convenient to collect the calcium citrate and yeast cells suspended in the cultured medium at the same time by filtration. After washing, the filter cake is added with a proper amount of sulfuric acid to liberate and dissolve the citric acid. Then the insoluble materials consisting of calcium sulfate and yeast cells are separated by filtration. After treating with decolorizing carbon or ion-exchange resin the filtrate is concentrated and the separated citric acid is collected. As an alternative method, calcium citrate and yeast cells are separated from the medium at the same time by filtration. After washing, the filter cake is suspended in water and the suspension is added with a certain amount of hydrochloric acid to liberate and dissolve citric acid, and then yeast cells are separated by filtration. After decolorizing with active carbon or ion-exchange resin for decolorization the filtrate is added with concentrated aqueous ammonia to result weak alkaline reaction and then heated under boiling and finally precipitated calcium citrate is collected.

In the fermented broth obtained by the process of the invention, oxalic acid is scarcely produced and also the production of organic acids other than citric acid is hardly recognized, in contrast to the conventional citric acid fermentation using a mold belonging to Aspergillus genus.

The effects of the present invention are summarized as follows:

1. The strains belonging to the organism *Candida oleophila*, being quite stable and easy to handle, produce citric acid in major amounts.
2. According to the present invention initial sugar concentrations of above 170 g./l. may be applicable and the fermentation is completed within about 96 hours; therefore a smaller scale apparatus can be used for the present process compared with that of the conventional process for the production of citric acid by fermentation.
3. According to the present invention the fermentation can be achieved satisfactorily at a pH value of about 6 instead of the lower pH values conventional for the prior art and also cheaper materials may be used for the fermenting vessel used for the present process.
4. As to the sugars added to the culture medium for the present process glucose, fructose, succharified syrup of starch, high-test molasses, beet sugar blackstrap molasses, cane sugar blackstrap molasses can be used solely or combined.
5. According to the present invention when an oligosaccharide, such as high-test molasses, beet sugar blackstrap molasses, cane sugar blackstrap molasses and raw sugar is used in the medium, treatments of both inversion and sterilization can be carried out at the same time with a strong acid or with decationation treatment at a temperature of above 80° C.
6. According to the present invention, cane sugar blackstrap molasses which is thought quite difficult to use for the citric acid fermentation with a strain belonging to *Aspergillus niger* may be used without carrying out the purifying treatments such as desalting, treatment with potassium ferrocyanide treatment and addition of methanol to yield citric acid satisfactorily.

7. According to the present invention, acids other than citric acid, especially oxalic acid are scarcely produced during the acid producing stage, contrary to the prior art using strains belonging to *Aspergillus niger*. Also, the recovering of citric acid is quite easy.
8. The present process may be carried out either in batch or continuous process.
9. Accordingly, with the present invention, citric acid or its salts can be obtained economically.

EXAMPLE 1

The inoculum is prepared by incubating a strain belonging to *Candida oleophila* at 28° C. for 24 hours with shaking culture in 500 ml. content of Sakaguchi flasks each containing 100 ml. of the culture media which is sterilized with steam and has following composition:

|  | W/V% |
|---|---|
| glucose | 5 |
| urea | 0.2 |
| $KH_2PO_4$ | 0.02 |
| $MgSO_4 \cdot 7H_2O$ | 0.02 |
| $MnSO_4 \cdot nH_2O$ | 0.025 |
| yeast extracts | 0.5 |
| pH | 6.0 |

400 ml. of the inoculum thus obtained is used for inoculation to the fermentation medium.

The fermentation medium is prepared by dissolving 2,400 g. of glucose, 2.4 g. of $KH_2PO_4$, 2.4 g. of $MgSO_4 \cdot 7H_2O$ and 3.0 g. of $MnSO_4 \cdot H_2O$ in about 9 l. of water, sterilizing the obtained solution with steam at 120° C. for 15 minutes in a 30 l. fermenter jar and after cooling to 28° C. adding 10 g. of urea, 60 g. of cornsteep liquor and 1,300 g. of $CaCO_3$ each sterilized previously to the solution and finally filling up to 11.6 l. with water. Then the mixture is stirred to cause a solution as much as possible. The culture medium thus obtained is inoculated with the inoculum obtained above.

In the main fermentation stage the initial concentration of sugars and the initial pH value of the medium are thus regulated to 20 W/V% and 6.8 respectively.

Soon after the inoculation, fermentation is started under an aeration rate of 4 l./m. and an agitation rate of 400 r.p.m. at 28° C. These conditions are maintained until the completion of the fermentation.

After 24 hours cultivation population of microorganisms reaches to a maximum of $1 \times 10^9$ cells/ml. and thereafter, citric acid accumulates rapidly in the medium as calcium salt and the fermentation is completed in overall 96 hours.

The estimations of citric acid and sugars in the medium during the fermentation are as shown in table 3.

TABLE 3

| Cultured period (hour) | Residual sugar (g.l.) | Citric acid (g./l.) | Yield based on the consumed sugar, percent |
|---|---|---|---|
| 0 | 200 | | |
| 24 | 175 | 8.7 | 35 |
| 48 | 105 | 59.5 | 62.6 |
| 72 | 38 | 121.8 | 72.5 |
| 96 | 3 | 152.7 | 77.7 |

After separation of calcium citrate thus produced, yeast cells and excess calcium carbonate by filtration and then washing, citric acid is liberated from the filtered cake by addition of sulfuric acid and the yeast cells and the precipitated calcium sulfate are filtered off and after neutralizing with calcium milk the filtrate is boiled to precipitate calcium citrate.

The yield of calcium citrate is as follows:

| crude calcium citrate | 2,530 g. |
|---|---|
| purity (as anhydrous citric acid) | 65.8% |
| yield based on the added sugars (as anhydrous citric acid) | 69.5% |

EXAMPLE 2

Cane sugar blackstrap molasses from the Philippines (whole sugars 58.4 percent, ash 8.68 percent, assimilable nitrogen 0.097 percent) is added with water of its twice volume and then added with sulfuric acid to adjust its pH value at 1.5. After inverting and sterilizing at a temperature of about 85° C. for 40 minutes the solution is neutralized by addition of calcium milk at pH 6.8. After filtration of the precipitated calcium sulfate the filtrate is used as the sugar source for the fermentation. 400 ml. of inoculum incubated according to example 1 is used. The cane sugar blockstrap molasses of the volume containing 2,400 g. of sugars calculated as glucose is placed in a 30 l. content of jar-fermenter which was previously sterilized with steam and cooled to 28° C. and further 12 g. of urea and 1,240 g. of calcium carbonate which were previously sterilized are added and then sterilized water is added to fill up to the whole volume of 11.6 l. and after then the said inoculum is inoculated. The initial sugar concentration of the medium is 20 W/V%.

After the inoculation the fermentation is carried out under conditions of aeration at a rate of 4 l./min. and agitation rate of 400 r.p.m. at 28° C.

After 24 hours cultivation the cell number reaches a maximum of $8 \times 10^8$ cells/ml. and thereafter citric acid accumulate rapidly as the calcium salt in the culture medium. After 96 hours incubation the fermentation is completed.

The assays during the cultivation are as shown in the following table 4:

TABLE 4

| Cultured period (hour) | Residual sugar (g.l.) | Citric acid (g./l.) | Yield based on the consumed sugar, percent |
|---|---|---|---|
| 0 | 200 | | |
| 24 | 182 | 4.0 | 22.2 |
| 48 | 145 | 26.1 | 47.5 |
| 72 | 48 | 89.2 | 58.7 |
| 96 | 13 | 121.5 | 65.0 |

After separation of calcium citrate, yeast cells and excess calcium carbonate (in the cultured broth) by filtration and washing, citric acid is liberated from the filtered cake by addition of hydrochloric acid and after the filtration of yeast cells the filtrate is neutralized with concentrated ammonia and then boiled to precipitate calcium citrate. The yield of calcium citrate is as follows:

| crude calcium citrate | 2,100 g. |
|---|---|
| purity (calculated as anhydrous citric acid) | 65.4% |
| yield based on the added sugars (calculated as citric acid) | 57.1% |

What we claim is:

1. A process for the production of citric acid or its salts, which comprises:
   a. culturing a microbial strain known as *Candida oleophila* under aerobic conditions in a culture medium containing assimilable carbohydrates, suitable neutralizing agents capable of neutralizing the citric acid so produced, and inorganic and organic metabolites to accumulate a major amount of citrate; and
   b. recovering the citrate from the cultured broth.

2. A process as claimed in claim 1, wherein the cultivation is carried out at a temperature in the range of 22° to 33° C.

3. A process as claimed in claim 8, wherein the cultivation is carried out at a pH value in the range of 4 to 8 by the initial addition or occasional additions of a suitable amount of neutralizing agent.

4. A process as claimed in claim 8, wherein the cultivation is carried out in a fermenter with a rate of aeration regulated to fall in the range of one-eighth to 2 v.v.m.

5. A process as claimed in claim 1, wherein the initial concentration of sugars in the culture medium is above 100 g./l., calculated as glucose.

6. The process as claimed in claim 5, wherein the initial concentration of sugars in the culture medium is above 170 g./l. calculated as glucose.

7. A process as claimed in claim 1, wherein the initial concentration of assimilable nitrogen in the culture medium is adjusted at a suitable level in the range of 0.5 to 1.0 g./l. so that the maximum population of cultured cells in the medium falls in the range of 8.0 to $10 \times 10^8$ cells/ml.

8. A process as claimed in claim 1, wherein the cultivation is carried out in the culture medium consisting of high-test molasses, beet sugar blackstrap molasses, cane sugar blackstrap molasses or raw sugar, which is both hydrolyzed and sterilized at the same time by treatment with a strong acid or cation exchange resin at a temperature of about 80° C.

9. A process as claimed in claim 1, wherein the neutralizing agent is calcium carbonate.

10. A process as claimed in claim 1 wherein the culturing period ranges from 3 to 7 days.

* * * * *